2,850,429

LIQUID VITAMIN PREPARATION

John J. Gulesich and George M. Piersol, Jr., Philadelphia, Pa., assignors to Smith, Kline & French Laboratories, Philadelphia, Pa., a corporation of Pennsylvania No Drawing. Continuation of application Serial No. 522,388, July 15, 1955. This application November 18, 1957, Serial No. 696,934

13 Claims. (Cl. 167—81)

This invention relates to a liquid vitamin preparation which is useful for the treatment of anemia and malnutritional states.

Unexpectedly, the use of the preparation in accordance with this invention provides a surprisingly high level of absorption of cobalamin vitamins. It has been found that the preparation of this invention produces serum levels of cobalamin vitamins which are greatly in excess of the serum levels which can be achieved with heretofore known preparations. This is of great importance, for example, in the treatment of geriatic patients since they normally absorb very little of the cobalamin vitamins. In clinical tests there were achieved markedly higher cobalamin vitamin serum levels with the preparation of this invention than were achieved utilizing the combination of a cobalamin vitamin and intrinsic factor.

The liquid vitamin preparation in accordance with this invention has as its essential ingredients a cobalamin vitamin, ethyl alcohol and water. The preferred cobalamin vitamin is vitamin $B_{12}$, cyanocobalamin. Exemplary of other satisfactory cobalamin vitamins are the compounds where a non-toxic radical such as a hydroxy, nitro or chloro radical replaces the cyano radical in cyanocobalamin, for example, hydroxycobalamin ($B_{12b}$), anhydrous hydroxycobalamin ($B_{12a}$), nitrocobalamin ($B_{12c}$), chlorocobalamin. Further exemplary of satisfactory cobalamin vitamins, are cobalamin, dicyanocobalamin, thiocyantocobalamin, sulfatocobalamin, sulfitocobalamin and the hydrogen sulfide addition product of cyanocobalamin.

The cobalamin vitamin will be present in an amount of from about 25 to about 1500 micrograms percent, that is, from about 25 to about 1500 micrograms per 100 ml. of the final preparation. Preferably the cobalamin vitamin will be present in the preparation in an amount of from about 50 to about 500 micrograms percent, that is, from about 50 to about 500 micrograms per 100 ml. of the final preparation. The volume of the ethyl alcohol present will be from about 10% to about 40% of the total volume of the preparation and preferably from about 15% to about 30% of the total volume of the preparation. Water is employed in an amount to bring the preparation to the volume of 100%.

Advantageous results are achieved if inositol or a polyhydric alcohol of the formula $C_6H_{14}O_6$ such as, for example, sorbitol or mannitol is also employed. When used the inositol will be present in an amount by weight of from about 1% to about 15% of the total volume of the preparation, the weight being measured in grams and the volume being measured in cubic centimeters (w./v.). The polyhydric alcohol when used will be present in an amount by weight of from about 10% of the volume of the final preparation (the weight being measured in grams and the volume being measured in cubic centimeters) and up to the limit of solubility in the preparation. For superior results it is preferred to have both the polyhydric alcohol and the inositol present in the preparation.

Advantageous results are also achieved if caffeine or a caffeine salt is added to the preparation containing the cobalamin vitamin and ethyl alcohol or additionally containing inositol and/or the polyhydric alcohol. Exemplary of satisfactory caffeine salts are caffeine citrate, caffeine phosphate, caffeine sulfate and caffeine hydrochloride. Citrated caffeine may be substituted for caffeine citrate. It is intended that the term "caffeine" as used in the description and claims covers both caffeine and pharmaceutically suitable forms of caffeine such as a caffeine salt. When employed, the caffeine will be present in the preparation in an amount by weight equal to from about 0.1% of the volume of the preparation and up to the limit of solubility in the preparation but not exceeding an amount by weight equal to 3% of the volume of the preparation, the weights being measured in grams and the volume being measured in cubic centimeters (w./v.).

Most advantageous results are achieved if all of the above mentioned ingredients, namely, a cobalamin vitamin, ethyl alcohol, inositol, a polyhydric alcohol and caffeine are present in the preparation of this invention together with water to bring the volume up to 100%.

Other pharmaceutical agents may be added, if desired, such as, for example, a lipotropic agent such as betaine, choline or methiomine or other "B" vitamins such as riboflavin, pyridoxine hydrochloride or nicotinamide.

Where ingredients in addition to the cobalamin vitamin and ethyl alcohol are added to the preparation, water is still added in an amount to bring the volume of the preparation to 100%.

If desired, other agents such as, for example, a ferric ion producing salt may be added. Thus, for example, ferric ammonium citrate or soluble ferric pyrophosphate may be employed in an amount by weight of from about 0.1% to about 1% of the volume of the preparation, the weight being measured in grams and the volume being measured in cubic centimeters (w./v.).

The preparation in accordance with this invention is readily prepared using simple techniques well known to the art. Thus, for example, it may be prepared by first placing about 50% of the volume of water required in a vessel and then adding the remaining ingredients in any order while stirring. Sufficient water to bring the volume up to 100% may then be added and the preparation stirred.

This invention will be further clarified by reference to the following specific examples:

Example 1

Vitamin $B_{12}$ ---------------------micrograms-- 167
Ethyl alcohol, U. S. P ----------------------cc-- 16
Water q. s. to make volume of preparation 100 cc.

Example 2

Vitamin $B_{12}$ ---------------------micrograms-- 1,000
Ethyl alcohol, U. S. P ----------------------cc-- 30
Water q. s. to make volume of preparation 100 cc.

Example 3

Vitamin $B_{12}$ ---------------------micrograms-- 200
Ethyl alcohol, U. S. P ----------------------cc-- 20
Inositol ---------------------------------------gm-- 5
Water q. s. to make volume of preparation 100 cc.

Example 4

Vitamin $B_{12}$ ---------------------micrograms-- 200
Ethyl alcohol, U. S. P ----------------------cc-- 20
Sorbitol --------------------------------------gm-- 50
Water q. s. to make volume of preparation 100 cc.

Example 5

| | | |
|---|---|---|
| Vitamin $B_{12}$ | micrograms | 167 |
| Ethyl alcohol | cc | 16 |
| Inositol | gm | 3 |
| Sorbitol | gm | 28 |

Water q. s. to make volume of preparation 100 cc.

Example 6

| | | |
|---|---|---|
| Vitamin $B_{12}$ | micrograms | 167 |
| Ethyl alcohol | cc | 16 |
| Inositol | gm | 3 |
| Sorbitol | gm | 28 |
| Citrated caffeine | gm | 1.296 |

Water q. s. to make volume of preparation 100 cc.

Example 7

| | | |
|---|---|---|
| Vitamin $B_{12}$ | micrograms | 500 |
| Ethyl alcohol | cc | 25 |
| Caffeine phosphate | gm | 0.5 |

Water q. s. to make volume of preparation 100 cc.

Example 8

| | | |
|---|---|---|
| Vitamin $B_{12}$ | micrograms | 167 |
| Ethyl alcohol | cc | 16 |
| Inositol | gm | 3 |
| Sorbitol | gm | 28 |
| Citrated caffeine | gm | 1.296 |
| Riboflavin | gm | 0.012 |
| Vitamin $B_6$ | gm | 0.04 |
| Nicotinamide | gm | 0.14 |
| Choline dihydrogen citrate | gm | 3.0 |
| Betaine | gm | 14.0 |
| Soluble ferric pyrophosphate | gm | 0.70 |

Water q. s. to make volume of preparation 100 cc.

Example 9

| | | |
|---|---|---|
| Hydroxycobalamin | micrograms | 167 |
| Ethyl alcohol | cc | 16 |

Water q. s. to make volume of preparation 100 cc.

Example 10

| | | |
|---|---|---|
| Nitrocobalamin | micrograms | 167 |
| Ethyl alcohol | cc | 16 |

Water q. s. to make volume of preparation 100 cc.

Example 11

| | | |
|---|---|---|
| Chlorocobalamin | micrograms | 200 |
| Ethyl alcohol | cc | 20 |
| Sorbitol | gm | 50 |

Water q. s. to make volume of preparation 100 cc.

Example 12

| | | |
|---|---|---|
| Dicyanocobalamin | micrograms | 167 |
| Ethyl alcohol | cc | 16 |
| Inositol | gm | 3 |
| Sorbitol | gm | 28 |

Water q. s. to make volume of preparation 100 cc.

Example 13

| | | |
|---|---|---|
| Thiocyanotocobalamin | micrograms | 167 |
| Ethyl alcohol | cc | 16 |
| Inositol | gm | 3 |
| Sorbitol | gm | 28 |

Water q. s. to make volume of preparation 100 cc.

Example 14

| | | |
|---|---|---|
| Sulfatocobalamin | micrograms | 167 |
| Ethyl alcohol | cc | 16 |
| Inositol | gm | 3 |
| Sorbitol | gm | 28 |
| Citrated caffeine | gm | 1.296 |

Water q. s. to make volume of preparation 100 cc.

Example 15

| | | |
|---|---|---|
| Sulfitocobalamin | micrograms | 167 |
| Ethyl alcohol | cc | 16 |
| Inositol | gm | 3 |
| Sorbitol | gm | 28 |
| Citrated caffeine | gm | 1.296 |

Water q. s. to make volume of preparation 100 cc.

This application is a continuing application based on application Serial No. 522,388, filed July 15, 1955, now abandoned.

What is claimed is:

1. A liquid vitamin preparation comprising from about 25 to about 1500 micrograms percent of a cobalamin vitamin, from about 10% to about 40% w./v. of ethyl alcohol, from about 10% w./v. up to the limit of solubility of a polyhydric alcohol having the formula $C_6H_{14}O_6$ and water.

2. A liquid vitamin preparation comprising from about 25 to about 1500 micrograms percent of a cobalamin vitamin, from about 10% to about 40% w./v. of ethyl alcohol, from about 1% to about 15% w./v. of inositol, from about 10% w./v. up to the limit of solubility of a polyhydric alcohol having the formula $C_6H_{14}O_6$ and water.

3. A liquid vitamin preparation comprising from about 25 to about 1500 micrograms percent of a cobalamin vitamin, from about 10% to about 40% w./v. of ethyl alcohol, from about 10% w./v. up to the limit of solubility of a polyhydric alcohol having the formula $C_6H_{14}O_6$, from about 0.1% w./v. up to the limit of solubility but not in excess of 3% w./v. of caffeine and water.

4. A liquid vitamin preparation comprising from about 25 to about 1500 micrograms percent of a cobalamin vitamin, from about 10% to about 40% w./v. of ethyl alcohol, from about 1% to about 15% w./v. of inositol, from about 10% w./v. up to the limit of solubility of a polyhydric alcohol having the formula $C_6H_{14}O_6$, from about 0.1% w./v. up to the limit of solubility but not in excess of 3% w./v. of caffeine and water.

5. A liquid vitamin preparation comprising from about 25 to about 1500 micrograms percent of cyanocobalamin, from about 10% to about 40% w./v. of ethyl alcohol, from about 10% w./v. up to the limit of solubility of a polyhydric alcohol having the formula $C_6H_{14}O_6$ and water.

6. A liquid vitamin preparation comprising from about 25 to about 1500 micrograms percent of cyanocobalamin, from about 10% to about 40% w./v. of ethyl alcohol, from about 1% to about 15% w./v. of inositol, from about 10% w./v. up to the limit of solubility of a polyhydric alcohol having the formula $C_6H_{14}O_6$ and water.

7. A liquid vitamin preparation comprising from about 25 to about 1500 micrograms percent of cyanocobalamin vitamin, from about 10% to about 40% w./v. of ethyl alcohol, from about 10% w./v. up to the limit of solubility of a polyhydric alcohol having the formula $C_6H_{14}O_6$, from about 0.1% w./v. up to the limit of solubility but not in excess of 3% w./v. of caffeine and water.

8. A liquid vitamin preparation comprising from about 25 to about 1500 micrograms percent of cyanocobalamin, from about 10% to about 40% w./v. of ethyl alcohol, from about 1% to about 15% w./v. of inositol, from about 10% w./v. up to the limit of solubility of a polyhydric alcohol having the formula $C_6H_{14}O_6$, from about 0.1% w./v. up to the limit of solubility but not in excess of 3% w./v. of caffeine and water.

9. A liquid vitamin preparation comprising from about 25 to about 1500 micrograms percent of a cobalamin vitamin, from about 10% to about 40% w./v. of ethyl alcohol, from about 10% w./v. up to the limit of solubility of sorbitol and water.

10. A liquid vitamin preparation comprising from about 25 to about 1500 micrograms percent of cyanocobalamin, from about 10% to about 40% w./v. of ethyl alcohol, from about 10% w./v. up to the limit of solubility of sorbitol and water.

11. A liquid vitamin preparation comprising from about 25 to about 1500 micrograms percent of a cobalamin vitamin, from about 10% w./v. up to the limit of solubility of a polyhydric alcohol having the formula $C_6H_{14}O_6$ and an aqueous vehicle.

12. A liquid vitamin preparation comprising from about 25 to about 1500 micrograms percent of a cobalamin vitamin, from about 10% w./v. up to the limit of solubility of sorbitol and an aqueous vehicle.

13. A liquid vitamin preparation comprising from about 25 to about 1500 micrograms percent of cyanocobalamin, from about 10% w./v. up to the limit of solubility of sorbitol and an aqueous vehicle.

References Cited in the file of this patent

Modern Drugs, January 1952, pp. 24–26.
J. of the Am. Pharm. Assoc., Pract. Pharm. Ed., vol. 13, No. 1, January 1952, p. 34.
Drug and Cosmetic Ind., vol. 12, No. 3, March 1953, pp. 320–321.
Unlisted Drugs, vol. 14, No. 8, Aug. 31, 1952, p. 115.